United States Patent Office 3,428,540
Patented Feb. 18, 1969

3,428,540
PROCESS FOR MAKING TRIFLUOROAMINE OXIDE
William B. Fox, Jefferson Township, Morris County, James S. MacKenzie, Parsippany Troy Hills, and Nicholas Vanderkooi, Jr., Pequannock Township, Morris County, N.J., assignors to Allied Chemical Corporation, New York, N.Y., a corporation of New York
No Drawing. Filed Mar. 9, 1962, Ser. No. 179,521
U.S. Cl. 204—177    10 Claims
Int. Cl. B01k 1/00

This invention is directed to the compound trifluoroamine oxide, $F_3NO$, a colorless gas at N.T.P., and to processes for making the same.

Objectives of the invention are to provide a fluorine-nitrogen-oxygen high energy propellant oxidizer, and to afford processes for making the same from available raw materials.

In accordance with the invention, it has been found that when oxygen difluoride is reacted under certain conditions with certain nitrogen-fluorine materials, the compound $F_3NO$ is synthesized and is produced in recoverable form. The nitrogen-fluorine materials which may be reacted with oxygen difluoride are (a) nitrogen trifluoride and (b) a mixture of elemental nitrogen and elemental fluorine.

Oxygen difluoride, $OF_2$, has a B.P. of about minus 145° C., at atmospheric pressure, and an M.P. of about minus 224° C., and is a colorless gas at normal conditions. Nitrogen trifluoride, $NF_3$, has a B.P. of about minus 129° C. at atmospheric pressure, an M.P. of about minus 216° C., and is also a colorless gas at N.T.P. All of the $OF_2$, $NF_3$, elemental nitrogen and elemental fluorine used in practice of the process of the invention are known and available raw materials.

Generally, practice of the process aspects of the invention comprise subjecting a starting mixture of oxygen difluoride and nitrogen-fluorine material of the group consisting of (a) nitrogen trifluoride and (b) a mixture consisting of elemental nitrogen and elemental fluorine, preferably in the presence of helium, to the action of an electrical discharge effected in a reaction zone by maintaining across the reaction zone certain potential drops and certain amperages, and effecting the electrical discharge while maintaining in the reaction zone certain very low temperatures and pressures. We find that by so proceeding there is formed in the electrical discharge reaction zone a reaction product containing the compound $F_3NO$ which may be separated from unreacted starting materials and other reaction products, and recovered.

Apparatus which may be employed to carry out the processes of the invention is relatively simple, and may be substantially as described in appended Example 1. Apparatus embodies chiefly an electrical discharge tube constituting a reaction zone, plus suitable accessories for feeding starting materials to the reaction zone, for causing certain electrical discharge effects in the reaction zone, for maintaining certain temperatures and pressures in the reaction zone, and for recovering sought for product from the reaction zone. Although otherwise designed electrical discharge tubes may be employed, the discharge tube is preferably in the form of a U-tube provided at the upper end of one leg with a valve controlled gas inlet, and at the upper end of the other leg with a valve-controlled gas outlet. Electrodes, made for example of nickel, copper, or iron but preferably nickel, project into the upper ends of the U legs, and are suitably connected to a high voltage transformer.

According to one factor of the invention, it has been found that the starting materials fed into the reaction zone should be subjected to the action of a silent electrical discharge effected in the reaction zone preferably by maintaining across the reaction zone a potential drop substantially in the range of 1–20 kilovolts at a current substantially in the range of 5–50 milliamperes. Preferably, potential drop and current are held substantially in the ranges of 5–15 kilovolts and 15–50 milliamperes. In view of the foregoing voltage and current features, specific design of suitable discharge tubes, with respect to such factors as diameter and axial length of reaction zone and axial spacing apart of the electrodes, is within the skill of the art. Discharge tubes may be made of quartz, or other suitable materials such as pyrex and alumina.

As noted, reactant starting materials employed are a gaseous mixture consisting of $OF_2$ and $NF_3$, or a gaseous mixture consisting of $OF_2$ and elemental nitrogen and elemental fluorine. Mol proportions of $OF_2$:$NF_3$ may vary in the range of about 5:1 to 1:5, although a range of about 2:1 to 1:1 is preferred.

When $OF_2$, elemental nitrogen, and elemental fluorine are used as starting materials, mol proportions of $OF_2$:$N_2$:$F_2$ generally may be of the order of 1:1:1. Desirably, a moderate excess of fluorine is employed, and to this end it is preferred to employ fluorine in mol proportion range of about 1 to 2.

While the processes described may be carried out in the absence of helium, the presence of significant amounts of helium during reaction is desirable with respect to smoothing out and improving overall reaction results. Whether the starting material is a mixture of $OF_2$ and $NF_3$, or a mixture of $OF_2$, $N_2$ and $F_2$, it is preferred to utilize helium in amount in the range of about 5–100 mol percent on the basis of the total number of mols of reactants charged to the reaction zone.

Whatever particular starting material mixture is to be used, whether containing helium or not, the constituents may be proportionad in a premix tank as in the appended examples, or feed of constituents to the discharge tube reaction zone may be effected by means of suitable metering equipment.

In accordance with the invention, it has been found that, correlative with electrical discharge, very low temperatures and pressures are needed to effect formation of the $F_3NO$ product in the reaction zone. In general, temperatures and pressures are both held low enough to effect condensation in the reaction zone of a reaction product containing $F_3NO$. While temperature as high as about minus 160° C. may be used, ordinarily reaction temperatures are held in the lower range of about minus 180– minus 196° C. For the higher temperatures indicated, the reaction tube may be immersed in or otherwise refrigerated by a bath or slush of melting isopentane or melting dichlorodifluoromethane. Preferred reaction temperature is about minus 196° C. which may be maintained by a bath of liquid nitrogen.

We find that reactions should be carried out while maintaining low pressures in the reaction zone in the range of substantially zero up to about 150 mm. of Hg. Ordinarily, pressures substantially in the range of 2–100 mm. of Hg may be used for good results, while for best results, preferably pressures are held substantially in the range of 5–20 mm. of Hg. The indicated low pressures may be maintained in the electrical discharge reaction zone as by relative adjustment of the valve in the gas inlet pipe of the reaction zone and of a vacuum pump connected to a valve controlled gas outlet pipe of the reaction zone, as more particularly described in Example 1.

During the course of the reactions under the conditions stated, the discharge tube visibly glows, generally with color varying from blue to violet, and a reaction product is formed and condenses. Condensation of reaction product may be observed visually, and reaction product condenses in the discharge tube as a mixture of liquid and solid. Tests indicate that, in addition to $F_3NO$, the condensed reaction product contains materials such as $O_2F_2$, $N_2O$, $SiF_4$, $NO_2$, $N_2O_3$, $NOF$, and $(NO)_2SiF_6$.

Recovery of $F_3NO$ from the reaction product collected in the discharge tube on cessation of feed of raw materials may be effected in any suitable manner. $O_2F_2$ is a major by-product. While at least a large portion of this material may be separated from $F_3NO$ in a distillation train such as illustrated in Example 1, it has been found that $O_2F_2$ may be separated from the reaction product prior to recovery of $F_3NO$. Such procedure is preferred on the basis of safety and thoroughness of $O_2F_2$ removal from the system. Hence, on completion of reaction, the outlet and inlet valves of the reaction chamber may be closed, and the chamber warmed up sufficiently to vaporize the entire reaction product. Thereafter, the reaction zone may be cooled again to the temperature of liquid nitrogen. Vapor phase $O_2F_2$ decomposes to oxygen and fluorine which remain as gases when the balance of the reaction product is recondensed, and which gases may be bled out of the reaction zone on completion of recondensation. After disposal of oxygen and fluorine gases, $F_3NO$ may be recovered from the recondensate by any suitable vacuum fractional distillation procedure a representative illustration of which is detailed in following Example 1 demonstrating recovery of $F_3NO$ in a cold trap maintained at temperature of about minus 183° C.

The sought-for product has a boiling point of about minus 89° C. and a melting point of about minus 161° C. at atmospheric pressure, and is a colorless gas at normal conditions. By various physical and chemical analytical means delineated in Example 1, the product was identified as $F_3NO$ of the structure indicated. The $F_3NO$ compound provides a missile ingredient, a powerful high energy oxidizer for missile fuels, and an intermediate for the preparation of other high energy propellant oxidizers. The $F_3NO$ compound lowers substantially the freezing point of the known $N_2O_4$ oxidizer, and correspondingly increases the utility range of $N_2O_4$.

Example 1

In this run, apparatus employed was substantially as follows. Sources of gaseous $OF_2$, gaseous $NF_3$, and gaseous helium were connected thru valve-controlled conduits with a 3.3 liter steel premixing tank equipped with a pressure gauge. The tank was connected thru a valve-controlled inlet conduit to the top of the vertically disposed inlet leg of a U-shaped quartz electric discharge tube, the upper end of the vertically disposed outlet leg of which was connected to an outlet conduit having a control valve, and a pressure gauge intermediate the exit of the discharge tube and the control valve. The quartz discharge tube provided a U-shaped reaction zone having a diameter of about 18 mm., and a total axial length of about 250 mm. Projecting into the upper ends of the vertical legs of the discharge tube were nickel electrodes, axial distance between the ends of the electrodes within the reaction zone being about 100 mm. Outer ends of the electrodes were connected to a high voltage transformer. The tube outlet conduit, downstream of the control valve therein, was connected to the upstream end of a fractionation train comprising three series-connected U-tube traps. A conduit connecting the upper end outlet of the first U-tube with the upper end inlet of the second U-tube, and a conduit connecting the upper end outlet of the second U-tube with the upper end inlet of the third tube, were each provided with a control valve. The downstream end of the train was connected thru a valve-controlled conduit to a vacuum pump.

77.7 millimols of $OF_2$, 77.7 mmols of $NF_3$, and 132 mmols of helium and no other material were charged into the premix tank to provide a gas mixture therein having a total pressure of about 1590 mm. Source of supply to the premix tank was shut off, and the vacuum pump was put in operation to effectuate a high vacuum in the entire system including the electric discharge reaction tube and the fractionation train. The transformer was adjusted to impress across the electrodes a voltage of about 5 kilovolts at about 40 milliamperes. The valve in the gas line between the premix tank and the top end of the gas inlet leg of the discharge tube was opened. Operation of the vacuum pump at the tail end of the system and adjustment of the discharge tube inlet valve were such as to maintain throughout the run a pressure of about 10 to 15 mm. in the quartz discharge tube, such pressure being observable by the pressure gauge associated with the gas exit conduit of the discharge tube. Overall gas flow rate of the $OF_2$—$NF_3$—He mixture was about 187 mmols per hour. Throughout the run, temperature in the quartz electric discharge tube was maintained at about minus 196° C. by means of a liquid nitrogen bath, and the tube glowed with a blue-to-violet color. Operation was continued for about an hour at which time the entire charge in the premix tank was expended.

On completion of the reaction run, the transformer was turned off, the valves in the inlet and outlet conduits of the discharge tube were closed, and the orange colored liquid and solid reaction mixture in the discharge tube was warmed up sufficiently to vaporize all of the reaction zone contents. Purpose of such vaporization was to effect destruction of $O_2F_2$ which decomposes to the oxygen and fluorine gases which are uncondensable under the conditions of operations. Other materials in the reaction zone were recondensed by reinstatement of minus 196° C. temperature in the reaction zone, and subsequent to the resulting condensation, the valve in the exit line of the discharge tube was opened, and uncondensable gases mostly oxygen and fluorine were purged from the system by the vacuum pump.

The material remaining in the discharge tube was subjected to fractional distillation by vaporizing such material while in the discharge tube and passing the resulting gas stream successively thru the three U-traps of the fractionation train. The first trap (the trap immediately adjacent the electric discharge tube) was maintained at a temperature of about minus 130° C. by immersion in a slush-like mixture of melting pentane. The second trap was maintained at temperature of about minus 183° C. by means of an oxygen bath, and the third trap was maintained at temperature of about minus 196° C. by means of a bath of liquid nitrogen. During fractionation, pressures in the entire system including the discharge tube and the three traps were maintained very low, e.g. from about 2 mm. up to about 5 mm. The first trap condensed out of the gas stream materials such as $NO_2$, $NOF$, $(NO)_2SiF_6$, $N_2O_3$, and $SiF_4$. In the second trap, minus 183° C., there were recovered about 10 mmols of condensate. The third trap condensate contained $NF_3$. The 10 mmols of condensate recovered in the minus 183° C. trap were shown by tests including molecular weight, infrared spectrum and mass spectrum to consist of 8 mmols of a fluorine-nitrogen-oxygen compound and 3 mmols of $N_2O$. If desired, the latter may be separated from $F_3NO$ by the use of gas chromotography technique, or by low temperature distillation at atmospheric pressure in suitable equipment.

Recovered fluorine-nitrogen-oxygen compound, and other similar condensates obtained in runs carried out substantially the same as the above, were subjected to various physical and chemical tests to establish identity. Molecular weight by gas density tests showed 86.8 as distinguished from the theoretical 87.0 for $F_3NO$. Chemical analysis showed 15.0% N and 65.2% F, calculated values being 16.1% N and 65.5% F. Mass spectrum showed principal fragments to be $F_2NO^+$, $FNO^+$, $FN^+$, $NO^+$, and $F^+$. Infrared spectra indicated the presence of fluorine-nitrogen and nitrogen-oxygen bonds. Further, infrared spectrum indicated that the molecule has the form of a symmetric top rotor which should be characteristic of $F_3NO$. Nuclear magnetic resonance spectral data showed the presence of three equivalent fluorine atoms in the molecule, and that therefore the three fluorine atoms were bonded to the nitrogen. Evidence that the fluorines were bonded to the nitrogen was provided by the magnitude of the coupling constant, $J_{N-F}$ (128.5 cps.). The foregoing established the recovered fluorine-nitrogen-oxygen compound to be $F_3NO$ of the structure

Example 2

Apparatus employed comprised a premix tank, a valve-controlled pipe connection to a U-shaped quartz discharge tube, nickel electrodes, a high voltage transformer, a valve controlled gas line connected to the gas exit of the discharge tube, and a pressure gauge intermediate the exit of the discharge tube and the control valve. Such apparatus was substantially the same as described in connection with above Example 1. The valve controlled exit pipe of the discharge tube was connected to a vacuum pump. Gaseous $OF_2$, gaseous nitrogen and gaseous fluorine were charged into the premix tank (one liter capacity) at partial pressures of 300, 150 and 232 mm. respectively. The resulting mixture, containing $OF_2$, $N_2$ and $F_2$ in mol ratio of about 2:1:1.5 was then diluted to about a 732 mm. pressure with helium, i.e. to form a charge mixture consisting of $OF_2$, $N_2$, $F_2$ and helium. The vacuum pump was put in operation, and the transformer was adjusted to impress across the electrodes a voltage of about 10 kilovolts at about 25 milliamperes of current. The valve in the gas line between the premix tank and the top end of the gas inlet leg of the U-shaped discharge tube was opened. Operation of the vacuum pump at the tail end of the system and adjustment of the discharge tube inlet valve were such as to maintain in the quartz discharge tube throughout the run an approximate 10 to 15 mm. pressure which was observable by the pressure gauge associated with the gas exit conduit of the discharge tube. Overall gas flow rate of the

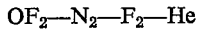

mixture was about 53 mmols per hour. Throughout the run, temperature in the electric discharge tube was maintained at about minus 196° C. by means of a liquid nitrogen bath. Operation was continued for about 45 minutes. The transformer was turned off, the valves in the inlet and outlet conduits of the discharge tube were closed, and the solid, yellowish reaction product in the discharge tube was allowed to warm up to room temperature to vaporize the reaction zone contents. After vaporization, the reaction product was analyzed by infrared spectrum and mass spectrum which spectra showed the presence of a significant amount of $F_3NO$, along with contaminants such as $NO_2$, $NOF$ and $SiF_4$.

We claim:

1. The process for making $F_3NO$ which comprises subjecting a starting mixture comprising oxygen difluoride and nitrogen-fluorine material of the group consisting of (a) nitrogen trifluoride and (b) a mixture of elemental nitrogen and elemental fluorine to the action of an electrical discharge effected in a reaction zone by maintaining across said zone a potential drop substantially in the range of 1–20 kilovolts at a current substantially in the range of 5–50 milliamperes, effecting said discharge while maintaining in said zone temperature substantially in the range of minus 160–minus 196° C. and pressure in the range of substantially zero–150 mm. of Hg absolute, whereby there is formed in said zone a condensed reaction product containing $F_3NO$, and discharging $F_3NO$ from the reaction zone.

2. The process for making $F_3NO$ which comprises subjecting a starting mixture comprising oxygen difluoride and nitrogen-fluorine material of the group consisting of (a) nitrogen trifluoride and (b) a mixture of elemental nitrogen and elemental fluorine to the action of an electrical discharge effected in a reaction zone by maintaining across the reaction zone a potential drop substantially in the range of 1–20 kilovolts at a current substantially in the range of 5–50 milliamperes, effecting said electrical discharge while maintaining in the reaction zone temperature not higher than about minus 160° C. and pressure not higher than about 150 mm. of Hg absolute to thereby form in the reaction zone a condensed reaction product containing $F_3NO$, and discharging $F_3NO$ from the reaction zone.

3. The process of claim 10 in which the reaction is carried out in the presence of helium in amount not less than about 5 mol percent on the basis of the total number of mols of reactants charged to the reaction zone.

4. The process of claim 1 in which temperature is substantially in the range of minus 180–minus 196° C. and pressure is substantially in the range of 2–100 mm. of Hg absolute.

5. The process of claim 1 in which the starting material charged comprises oxygen difluoride and nitrogen trifluoride in mol proportions in the range of about 5:1 to 1:5.

6. The process of claim 1 in which the starting material charged comprises oxygen difluoride, elemental nitrogen and elemental fluorine in mol proportions in the range of about 1:1:1 to 1:1:2.

7. The process for making $F_3NO$ which comprises subjecting a starting mixture comprising oxygen difluoride and nitrogen-fluorine material of the group consisting of (a) nitrogen trifluoride and (b) a mixture of elemental nitrogen and elemental fluorine to the action of an electrical discharge effected in a reaction zone by maintaining across the reaction zone a potential drop substantially in the range of 1–20 kilovolts at a current substantially in the range of 5–50 milliamperes, effecting said electrical discharge while maintaining in the reaction zone temperature substantially in the range of minus 160–minus 196° C. and pressure in the range of substantially zero–150 mm. of Hg absolute, whereby there is formed in the reaction zone a condensed reaction product containing $F_3NO$ and $O_2F_2$ as impurity, raising temperature sufficiently to vaporize said condensed reaction product to decompose $O_2F_2$ to uncondensable gases, recondensing other constituents of the vaporized reaction products, and recovering $F_3NO$ from the recondensed condensate.

8. The process for making $F_3NO$ which comprises subjecting a starting mixture of oxygen difluoride and nitrogen-oxygen material of the group consisting of (a) nitrogen trifluoride and (b) elemental nitrogen and elemental fluorine to the action of an electrical discharge effected in a reaction zone by maintaining across the reaction zone a potential drop substantially in the range of 5–15 kilovolts at a current substantially in the range of 15–50 milliamperes, effecting said discharge in the presence of helium in amount in the range of about 5–100 mol percent on the basis of the total number of mols of reactants charged, and while maintaining in the reaction zone a temperature of substantially minus 196° C. and pressure substantially in the range of 5–20 mm. of Hg absolute, whereby there is formed in the reaction zone a condensed reaction product containing $F_3NO$, and recovering $F_3NO$ from such reaction product.

9. The process of claim 8 in which the starting material charged comprises oxygen difluoride and nitrogen trifluoride in mol proportions in the range of about 2:1 to 1:1.

10. The process for making trifluoroamine oxide which comprises subjecting a starting material, comprising oxygen difluoride and nitrogen-fluorine material of the group consisting of (a) nitrogen trifluoride and (b) a mixture of elemental nitrogen and elemental fluorine, to the action of an electrical discharge effected in a reaction zone by maintaining across said zone potential drop and current conditions to form in said zone a visible glow, effecting said electrical discharge while maintaining in said zone temperature not higher than about minus 160° C. and pressure not higher than about 150 mm. of Hg absolute to thereby form in said zone a condensed reaction product containing $F_3NO$, and discharging $F_3NO$ from said reaction zone.

References Cited

UNITED STATES PATENTS

| 3,032,400 | 5/1962 | Marsh | 23—203 |
|---|---|---|---|
| 3,085,862 | 4/1963 | Atadan et al. | 23—203 |

EARL C. THOMAS, *Primary Examiner.*

EDWARD J. MEROS, *Assistant Examiner.*

U.S. Cl. X.R.

23—203